United States Patent [19]

Hesp et al.

[11] Patent Number: 5,708,061
[45] Date of Patent: *Jan. 13, 1998

[54] IN-SITU STABILIZED COMPOSITIONS

[75] Inventors: Simon Hesp, Kingston; Zhizhong Liang; Raymond T. Woodhams, both of Toronto, all of Canada

[73] Assignee: University of Toronto Innovations Foundation, Toronto, Canada

[*] Notice: The term of this patent shall not extend beyond the expiration date of Pat. No. 5,280,064.

[21] Appl. No.: 477,499

[22] Filed: Jun. 7, 1995

Related U.S. Application Data

[63] Continuation of Ser. No. 863,734, Apr. 6, 1992, Pat. No. 5,494,966, which is a continuation-in-part of Ser. No. 767,941, Sep. 30, 1991, Pat. No. 5,280,064.

[51] Int. Cl.$^6$ ..................................................... C08L 95/00
[52] U.S. Cl. ............................ 524/59; 525/54.5; 527/500
[58] Field of Search ............................ 525/54.5; 524/59; 527/500

[56] References Cited

U.S. PATENT DOCUMENTS

| | | | |
|---|---|---|---|
| 4,677,151 | 6/1987 | Pennewiss et al. | 524/501 |
| 5,280,064 | 1/1994 | Hesp et al. | 525/54.5 |

FOREIGN PATENT DOCUMENTS

| | | |
|---|---|---|
| 9002776 | 3/1990 | WIPO . |

*Primary Examiner*—Rachel Gorr
*Attorney, Agent, or Firm*—Sim & McBurney

[57] ABSTRACT

Insoluble particulate materials, which may be in solid or liquid form, are dispersed in a continuous non-aqueous phase and the dispersion rendered stable and resistant to phase separation by an in-situ stabilization procedure involving the formation of chemical bonds among the stabilizer components and to dispersed phases to form a network surrounding the particles which is compatible with the continuous phase. The invention has particular application for the formation of stabilized polyolefin-modified bitumen compositions for paving and other applications.

33 Claims, 1 Drawing Sheet

10μ

10μ

10μ

IN-SITU STABILIZED COMPOSITIONS

REFERENCE TO RELATED APPLICATION

This application is a continuation of application Ser. No. 07/863,734 filed Apr. 6, 1992 (now U.S. Pat. No. 5,494,966) which is a continuation-in-part of U.S. patent application Ser. No. 767,941 filed Sep. 30, 1991, (now U.S. Pat. No. 5,280,064).

FIELD OF INVENTION

The present invention relates to stabilizing insoluble particulate materials in liquid phases by an in-situ reaction.

BACKGROUND TO THE INVENTION

It often is necessary to maintain insoluble solid phase particulates or immiscible liquid phase droplets in suspension in a continuous liquid phase for a variety of purposes and emulsifiers of various type have been used to achieve such results. One common application is the emulsification of non-polar liquid hydrocarbons in water, in which the individual liquid hydrocarbon droplets remain discrete due to electrostatic repulsion of the adsorbed emulsifiers at the droplet interface.

In non-aqueous emulsions, there are no electrostatic forces and hence alternative methods must be employed to prevent coalescence and separation of the dispersed phase. One specific problem area in the latter category is the provision of stabilized bitumen-polymer compositions for use as a road surface asphalt and related uses.

It is well known that certain characteristics of bitumens can be improved by modification by or addition of polymeric materials. For example, European Patent Publication No. 317,025 to Shell Internationale Research Maatschappij BV, discloses a bitumen composition useful in road paving applications containing an asymmetric radial block copolymer which exhibits increased toughness and tenacity. Recently published PCT Publication No. WO 90/02776, to Société Nationale Elf Aquitaine discloses bitumens modified with a copolymer of styrene and a conjugated diene and a coupling agent, such as sulfur.

Among the properties of the bitumen composition which potentially can be improved by dispersion of polymeric materials therein, particularly in roadway applications, are increased rutting resistance, enhanced low temperature cracking resistance, improved traction, better adhesion/cohesion, elevated tensile strength as well as other benefits. However, a problem often encountered with bitumen-polymer mixtures is an incompatibility of the bitumen and polymer components. Bitumens and most polymers, especially polyolefins such as polyethylene, are not readily miscible with each other in a molten state. A tendency exists for a dispersed molten polymer to agglomerate and coalesce rapidly and not remain dispersed when stirring of the bitumen composition ceases. Once such phase separation occurs, the potential for the improved properties is lost.

One approach to overcoming this problem has been the use of another additive to form a stabilized bitumen gel as described in, for example, U.S. Pat. No. 4,018,730 (issued Apr. 19, 1977 to McDonald). This approach has the disadvantage of providing a thickened or jellied material, the higher viscosity of which has less desirable working characteristics than is desirable for conventional uses of bitumens.

More closely related to bituminous compositions obtainable with the present invention are those disclosed in, for example, U.S. Pat. No. 4,314,921 (issued Feb. 9, 1982 and assigned to Novophalt SA) and German Offenlegungsschrift 39 20 878 (published Jan. 4, 1990 and assigned to Novophalt SA). These documents disclose specific methods of physical mixture to achieve homogenization of molten bitumens and thermoplastic polymers, such as polyethylene. Such specialized mixing methods have heretofore been found to be necessary because of the difficulty of obtaining adequate dispersion of polymer components in the bituminous phase to provide desired qualities in the working material produced. As described in U.S. Pat. No. 4,314,921, shearing forces which degrade the polymer are apparently necessary to achieve homogenization. Further, there is a tendency for the homogenized bitumens and polymers to undergo gross phase separation even after such homogenization, necessitating continuous stirring and on site preparation. Commercial applications of the Novophalt process as described in this patent thus include the addition of paving components, such as sand and gravel, to the homogenized mixture within a relatively short period of time after the homogenization process is complete.

U.S. Pat. No. 4,154,710 of Maldonado et al. (issued May 15, 1979 to Elf Union)discloses a bitumen modified by heating bitumen in the presence of polyisobutene or a mixture of fatty acid esters (i.e. esters of oleic acid, palmitic acid, stearic acid with high alcohols, such as lanosterol, cholesterol or isocholesterol) consisting of a natural extract of mutton suet, in the presence of sulphur. Apparently stable mixtures were obtained with the admixture of polymers, such as isobutene-butadiene copolymer, ethylene-cyclopentadiene copolymer and polybutene-polyisobutene copolymers.

In U.S. Pat. No. 4,978,698, assigned to the assignee hereof and naming Raymond T. Woodhams as inventor, there is described another approach to stabilizing the dispersed polymer phase. As described therein, an emulsifier system for providing a dispersed polyethylene phase comprises a polyethylene wax having a molecular weight of about 1000 to about 10,000 and terminally functionalized with acidic groups, particularly carboxylic acid groups. Inorganic metal oxides may be provided in chemical association with the acidic groups of the polyethylene wax. While these compositions exhibit a degree of stability, phase separation often is observed to occur.

Steric stabilization has been attempted as a means of maintaining a polymeric material dispersed in bitumen, wherein the individual emulsified droplets are prevented from coalescence by some form of steric barrier. In these systems, repulsion between particles is due to kinetic action rather than electrostatic forces. However, none of these approaches has found success as a viable commercial operation. For example, some of the polymeric modifiers tend to precipitate on pavement rolling equipment, causing severer paving problems.

In addition, these prior approaches reply on improving compatibility between polymer and asphalt to resist coalescence and phase separation. This prior art does not contemplate systems which maintain insoluble or incompatible polymer particles or droplets stabilized in liquid asphalt medium and which are resistant to phase separation at elevated temperatures for long periods of time under quiescent conditions, as in the present invention.

SUMMARY OF INVENTION

We now have surprisingly found that we are able to achieve stable dispersions of insoluble polymers in bitumens which exhibit stability against phase separation in the liquid medium, in contrast to the prior art. Such stability is achieved by employing a novel in-situ stabilization procedure, as described below, which results in a steric stabilization of the insoluble polymer particles as a dispersed phase in the bitumen.

Such in-situ stabilization procedure is not limited in its application to stabilization of a dispersed insoluble polymer phase in bitumen but has general application to the dispersion of insoluble organic particulates in a non-aqueous continuous phase. One example of application of the principles of the invention is in the stabilization of particles of polyolefins in a lubricating oil to provide improved lubricating properties.

Other items of composition in which the system of the present invention is useful include inks, paints, varnishes, caulks, sealants, coatings, roofing membranes, containment films, shingles, potting resins, lubricants and greases.

Accordingly, in one aspect of the present invention, there is provided a stable composition comprising a continuous non-aqueous liquid phase; a dispersed particulate phase of organic material insoluble in the liquid phase; and a steric stabilizer anchored to the particulate phase and soluble in the liquid phase to maintain dispersed particles of the particulate phase spaced from each other in the liquid phase, so as to inhibit separation of the particulate phase from the liquid phase by progressive coalescence of dispersed particles.

The particulate phase may be in the form of solid particles or liquid droplets. The steric stabilizer component of the composition is formed by in-situ formation of chemical bonding among the steric stabilizer forming components and anchoring to the particulate organic material to form a specific steric layer having a partially crosslinked structure of chemical bonds binding the liquid phase and particulate phase in spaced relation.

GENERAL DESCRIPTION OF THE INVENTION

Figure 1:
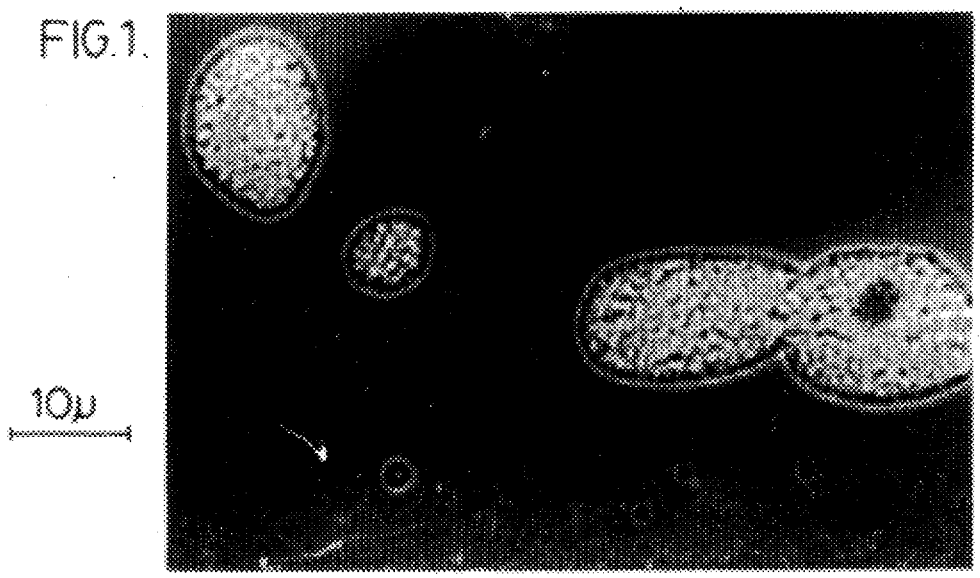
FIG. 1 is a high magnification (×1650) photograph of a sample of a bitumen-polyethylene composition prepared according to the method of Example 1 described below and not in accordance with the invention, showing the presence of coalesced polyethylene particles in the bitumen as they appear after holding for 3 hours at 160° C. without stirring.

The present invention is broadly directed to the stabilization of insoluble particulates in a non-aqueous continuous phase by the formation in-situ of chemical bonding and cross-linking between the non-aqueous continuous phase and the insoluble particulates.

A major application of the principles of the present invention is in the provision of stabilized polymer-modified bitumen compositions suitable for use as a paving material for all paving applications, including hot mix, cut-backs, emulsions and crack fillers, as well as other uses. The term "bitumen" used herein means a class of black or dark-colored (solid, semi-solid or viscous) cementitious substances, natural or manufactured, composed principally of high molecular weight hydrocarbons of which asphalts, tars, pitches and asphalites are typical. The term "asphalt" used herein means a dark, brown or black, cementitious material, solid or semi-solid in consistence, in which the predominating constituents are bitumens that occur in nature, as such, or are obtained as residue in petroleum refining.

The bitumen comprises the major continuous phase of the polymer-modified bitumen compositions and the polymer is dispersed in the bitumen, either as solid particles or liquid droplets, depending on the nature of the polymer and the temperature of the composition.

The polymer component of the bitumen composition may be any polymer which can be melted or particulated for dispersion in the bitumen and which imparts useful properties thereto. Generally, such polymer component comprises homopolymers and copolymers of ethylene and propylene, particularly homopolymers and copolymers of ethylene.

Virtually any grade of polyethylene polymer or copolymer may be used to provide the polymer component of the bitumen composition. One advantage provided by the present invention as it is applied to bitumen-polyethylene compositions, is the ability to employ recycled or waste polyethylene in providing the dispersed polyethylene phase, rather than requiring virgin material.

For the purpose of formation of the stable emulsion herein, bitumen is heated to a temperature above the melting point of the polyethylene or other olefin polymer, which then is dispersed in the bitumen by high shear mixing to form a uniform dispersed phase of liquid droplets in the bitumen, which, in the presence of a stabilizer, remain dispersed, when the high shear mixing ceases. However, any other convenient procedure for effecting dispersion of the particulate polymer phase may be employed. The quantity of polyethylene or other polymer dispersed in the bitumens may vary widely, depending on the properties desired and the end use to which the composition is to be put. Generally, for road pavement, the quantity of polymeric material present in the composition varies from about 0.5 to about 10 wt % of the bitumen, preferably about 2.5 to about 5 wt % of the bitumen.

While the bitumen is hot and the liquid droplets of polyethylene are uniformly dispersed by the shear forces applied thereto, the emulsion is stabilized in-situ by the chemical reactions described in more detail below. When such reactions are complete and the shear forces are removed, the polyethylene-modified bitumen composition shows no tendency to phase separate at mildly-elevated temperatures in the range of about 100° to 160° C. and remains stable in the absence of stirring. A photograph of a sample of composition provided in accordance with the invention is seen in FIG. 2, from which the dispersed nature of the small polyethylene droplets can be seen. This situation is to be contrasted with the photograph of FIG. 1, which depicts the situation only a few hours after removal of stirring from a composition formed by high shear mixing but not stabilized in accordance with the present invention.

An additional benefit which is achieved by the steric stabilization of the polyethylene or other olefin polymer achieved herein is that small discrete particles of polyethylene are spontaneously created by dispersion of the molten polymer, with a particle size which can be adjustable to obtain different average particle sizes as required, and may typically be less than one micron, which is an important attribute to toughness of a pavement or other end use of the composition. It is noted that simple mixing does not achieve such small dimensions, even when high shear conditions are employed, unless some dispersing agents are employed, for example, to lower interfacial tension and differences in viscosity between dispersed phase and continuous phase.

Figure 3:
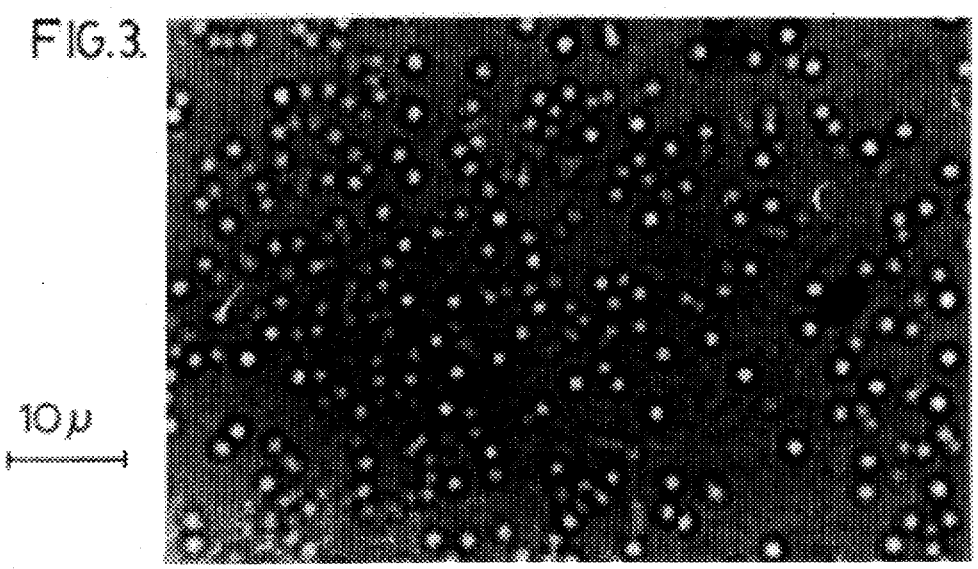
FIG. 3 is a high magnification (×1650) photograph of a stable polyethylene-bitumen dispersion as obtained using the method of Example 3 according to the invention, after repeated reheating of the sample from room temperature to 160° C., three times without stirring.

The composition also may be cooled to ambient temperature, may be reheated up to about 160° C. or more up to about 200° C. several times and may be maintained at such high temperature for several days, without any tendency to phase separation. A photograph of a sample of composition which has been heated up three times to 160° C. from room temperature is seen in FIG. 3. As can be seen, the small polyethylene droplets remain dispersed. This attribute is important, since on-site formation of the polyethylene-modified bitumen composition is not required, in contract to the situation which exists with high-sheared non-stabilized compositions. One particularly important facet of the invention is the ability to provide a stable concentrate of dispersed polyethylene in the bitumen, which can be readily transported to the site of use and then diluted with bitumen to the desired consistency without any phase separation occurring. The emulsion is inherently stable by reason of the chemical bonding and hence may be solidified and reheated without loss of uniformity or stability.

STERIC STABILIZATION

For the purpose of achieving stabilization of dispersed polyethylene or other olefin polymer in bitumen, it is necessary to achieve reaction of a number of components with each other and association with the continuous and dispersed phases.

Stabilization is achieved using a plurality of components. One component is a bitumen-soluble component comprising a bitumen-soluble first portion, generally bitumen itself, partially covalently-bonded to a polymeric second portion compatible with the bitumen-soluble first portion.

The bitumen-compatible organic polymer generally is alkenic and may be a conjugated diene polymer or polydiene-based copolymer. Preferably, the bitumen-compatible organic polymer is a polydiene having a molecular weight in the range of from about 500 to about 60,000, more particularly, a polydiene having a molecular weight in the range of from about 1,000 to about 12,000. Covalent linkage of the bitumen-compatible polymer to the bitumen may be effected by some reactive agents, which can generate free radicals, such as peroxide or elemental sulfur, with or without an accelerator and a sulfur donor.

A second component is a polymeric component miscible with the dispersed polymer phase so as to be anchored thereto in the stable dispersion and which also is capable of covalent bonding, such as by nucleophilic linkage with the bitumen-compatible polymeric second portion of the first component. Nucleophilic linkage is derived from the reaction of a functional group having a nucleophilic heteroatom, such as O, N or S, with an electrophilic atom, such as a carbonyl carbon in an anhydride group.

The second component preferably has a similar backbone structure to the dispersed phase polymer, usually polyethylene, which permits the polymer chain of the second component to blend with the molten dispersed polymer particles and to become anchored thereto. The second component may have a molecular weight of about 10,000 to about 1,000,000, preferably from about 50,000 to about 500,000.

Covalent linkage of the polymeric component to the bitumen-compatible organic polymer is effected, usually by reaction between a nucleophilic group, such as an amino group or carboxyl group, for example, provided on the bitumen-compatible organic polymer, and an electrophilic group, such as a carbonyl group, for example, present in an anhydride group, on the polymeric component miscible with organic polymer.

In one particular embodiment of the invention, there may be employed as the bitumen-compatible polymer a polybutadiene partially functionalized with a nucleophilic amino group and as the polymeric component miscible with the organic polymer there may be employed a carboxylated polyethylene.

Other known nucleophiles include hydroxyl, carboxyl and sulfhydryl and other known electrophiles include anhydrides and other carbonyl containing groups, and epoxy and isocyanate groups. The amine-terminated poly(butadiene-co-acrylonitrile) of the examples is a readily-available commercial product used for exemplification of the principles herein. Other amine functionalized polydiene polymers and butadiene copolymers containing substantially polybutadiene component with e.g., styrene comonomer, are just as or more suitable and effective. Further, a polydiene polymer of higher molecular weight may be more desirable as long as it is soluble or compatible at the operating temperature.

Other well known covalent linkages may be employed herein to bond the bitumen-compatible polymeric component and the polymeric component. Such covalent linkage may be achieved by other means, for example, a carboxylated polydiene polymer and a carboxylated polyolefin may be linked by a difunctional aminol, diamine or diol.

In addition to these components, a liquid polybutadiene soluble in the bitumen may be provided as a third component of the stabilizer. In some cases the polybutadiene or other polydiene may be omitted and the combination of the functionalized polydiene and the functionalized polymer is sufficient to effect the necessary reactions to achieve steric stabilization. It is necessary that the butadiene or other chain-extendable diene or polymer be of a molecular weight such that the butadiene is soluble in the bitumen, so as to facilitate the cross-linking with the other components of the stabilizer and chain extension of the butadiene upon free-radical coupling. The molecular weight (Mw) range of this third component may be from a low molecular weight, such as from about 500 to about 45,000 or higher, as long as the butadiene is soluble in the bitumen at the mixing temperature, generally from about 150° to about 200° C.

The components of the stabilizer composition, after addition to the stirred elevated temperature mixture of polyethylene and bitumen, are subjected to free-radical reaction, using a free-radical initiator, such as sulfur. Usually, however, it is more practical, because of viscosity considerations to form a pro-stabilizer from the stabilizer composition components which has pendant polymeric chains. Upon subsequent dispersion of the polymer in the bitumen as liquid droplets at elevated temperature, the liquid polymer droplets absorb the pendant polymeric chains and the stabilizer composition thereby becomes anchored to the polymer particles, providing the gel envelope described below.

The functionalized polydiene and functionalized polymer react to effect covalent bonding one to the other. Upon initiation of the free radical reaction between the various polydiene components as well as reactive components of the bitumen phase, such as by sulfur, the polybutadiene undergoes a series of cross-linking reactions to form a gel envelope which contributes significantly to the stability of the dispersed polymer particles.

In this regard, the free radical reaction causes cross-linking of the polybutadiene, cross-linking of the polybutadiene to the functionalized butadiene and linking to the bitumen. The net effect of these various reactions is to form an extended polybutadiene-based network with a partially cross-linked structure anchored to each of the polymer particles and swollen by the bitumen phase, to provide a gel envelope about the polymer particles, which prevents coalescence of the polymer particles.

The various components of the steric stabilizer are chemically-interlinked with each other and anchored to the polymer particles and the polybutadiene-based layer with a cross-linked structure which is swollen by the bitumen medium ensures a substantially fixed relationship of the polymer particles one to another within the continuous bitumen phase. The polybutadiene-based layer also is bonded to bitumen. The particles are prevented form approaching each other and coalescing, if molten, by the gel lattice of chemical bonds formed around each particle which provides a steric envelope about the individual particles. The particles, when in solid form, resist flocculation or precipitation for the same reason.

The compositions of the present invention may be produced in any convenient manner. In one embodiment, carboxylated polyethylene, liquid polybutadiene, (as required) amino-terminated polybutadiene polymer and elemental sulfur may be dispersed in bitumen. For a paving application, a preferred ratio of carboxylated polyethylene to bitumen is from about 0.1 to about 5 per cent by weight, more preferably, from about 0.3 to about 1 per cent by weight, and a preferred ratio of amino-functionalized butadiene based copolymer is from about 0.1 wt % to about 3 wt %, more preferably about 0.2 to about 1 wt %. The amount of liquid butadiene may be preferably in the range of about 0.1 to about 10 wt %, more preferably from about 0.4 to about 6 wt %, of bitumen. The amount of sulfur is preferably between about 0.3 per cent and about 3 per cent of the total mixture, by weight.

The four ingredients are added to a heated bitumen with stirring, which may comprise high shear mixing conditions at about 100° to about 250° C., preferably about 130° to about 200° C. for a suitable period of time, which may be about 0.5 to about 2.5 hours, to form a homogeneous composition, which can be termed a concentrate. This concentrate constitutes one aspect of the present invention and may be shipped to the site of formation of the final blend from concentrate, additional bitumen and polyethylene. Accordingly, in this aspect of the invention, there is provided a bituminous composition for forming a stable dispersion of olefinic polymer particles in a bitumen, comprising a bitumen-compatible component, and a bitumen-compatible polymer bonded to an olefinic polymeric material and dissolved in the bitumen-compatible component, which functions as a pro-stabilizer. Such a concentrate may be employed in the broader application of the invention to the dispersion of an insoluble organize phase in a non-aqueous liquid phase.

The polyethylene requiring dispersion in the bitumen is added to the concentrate at the elevated temperature, along with additional bitumen, as required, and stirring is continued until the polyethylene is dispersed into the system to form a stable polymer-asphalt composition. Pendant olefinic polymer chains on the pro-stabilizer are absorbed by the molten polyethylene and thereby blend therein, so that the stabilizer material becomes anchored to the polyethylene particles. The amount of polyethylene is present in such composition is preferably between about 0.1 to 10 percent by weight, and more preferably from about 1 to about 5 percent by weight, for paving application. Greater or less amounts of polyethylene or other dispersed polymer may be employed depending on the end use of the composition.

The present invention thus provides a stabilized molten bituminous mixture having polyethylene particles which do not coalesce at elevated temperatures. The inventors have thus found that, while a stabilizer having a polyethylene portion can stabilize molten bituminous compositions having a polyethylene additive, those skilled in the art would understand that other compositions having polymer additives of the same type would be stabilized against gross phase separation by this stabilizer. In this context, a polymer segment which is miscible with molten polyethylene so as to be blended therein and anchored thereto and which forms stable droplets in the presence of the stabilizer, as shown in FIG. 2, thus is considered to be of the same type as polyethylene. Polyethylene and poly(ethylene-co-vinyl acetate) are considered to be polymers of the same type.

Similarly, it will be apparent that the principles of the present invention generally are applicable to the formation of a sterically-stabilized dispersion of an insoluble dispersed particulate phase in a non-aqueous liquid continuous phase. What is required is a component which can be bound to the liquid phase, a component that can be bound to the dispersed phase and a liquid phase-soluble or -compatible, crosslinkable polymer component as a stabilizing layer anchored to the dispersed phase particles and surrounding each dispersed phase particle.

It has been found that an effective dispersion temperature is obtained at about 10° to 50° C. above the melting or softening point of the polymer being dispersed, depending on factors, such as polymer molecular weight, matrix viscosity and shear force of mixing. Thus, a grade of polyethylene having a melting temperature of 115° to 130° C. can be dispersed at a temperature of from about 120° C. to 190° C. Commonly found low density, linear low density and high density polyethylenes thus may be dispersed and stabilized by a stabilizer of the present invention. Most polyethylenes used in consumer products have melting temperatures in the acceptable range and polyethylene polymer blends, such as are obtained in pellets of recycled material, are suitable for dispersal in bitumens and may be stabilizated according to the present invention.

An upper limit may be placed on the time and temperature used in dispersal of a polymer in bitumen according to the disclosed embodiments of the present invention because of the lack of stability of polybutadiene polymers above about 210° C., especially in air. However, it is possible to disperse a polymer in bitumen at a temperature higher than 210° C. if an inert gas, such as nitrogen, blankets the mixing process.

The quantity of steric stabilizer required to achieve the required stability is quite small, generally less than about 2 wt % of bitumen, depending on several factors, such as the dispersed amount of polymer and the microstructure of the steric stabilizer formed, since different butadienes with different cis and trans-contents and vinyl content may form different microstructures through different cross-linked extended chains. The cost of achieving the stability is economically attractive.

While the sue of the stabilized polyethylene-modified bitumen composition as a paving material for all types of paving has been emphasized herein, the stabilized bitumen composition also finds applications in roofing membranes, shingles, waterproofing membranes, sealants, caulks, potting resins and protective finishes. Paving materials generally include aggregate, such as crushed stone pebbles, sand etc., along with the bitumen composition. Similarly, other additives to the bitumen composition are employed, depending on the end use to which the invention is put. For example, a roofing material may be obtained by the addition of suitable fillers, such as asbestos, carbonates, silicas, wood fibers, mica, sulfates, clays, pigments and/or fire retardants, such as chlorinated waxes.

As mentioned above, the principles of the present invention are not limited to effecting stabilization of bitumen-polyethylene compositions, but may be employed for the stabilization of dispersion of a wide variety of insoluble solid phase particulate materials in a wide variety of non-aqueous liquid phase material.

In the following Examples, samples of bitumen from two different sources are employed. To the extent that the properties of these materials are known, they are summarized in the following Table A:

TABLE A

| Property | Lloydminister 85–100 | Bow River 290 |
| --- | --- | --- |
| Viscosity[+], Pa s | | |
| @ 100° C. | 4.30 | 1.29 |
| @ 120° C. | 1.00 | 0.40 |
| @ 140° C. | 0.34 | 0.16 |
| @ 160° C. | 0.15 | 0.07 |
| Density at 15° C., g mL$^{-1}$ | 1.026 | 1.015 |
| Molecular Weight[*], g mol$^{-1}$ | 1200 | 975 |
| Composition[#], % | | |
| Asphaltenes | 10.8 | 10.3 |
| Polar Aromatics | 28.0 | 25.5 |
| Naphthene Aromatics | 43.1 | 45.6 |
| Saturates | 18.1 | 18.5 |

[+]Brookfield Viscometer
[*]Ebulliometry
[#]ASTM D4124-86

EXAMPLES

Example 1

This Example illustrates conventional high shear mixing of polyethylene and bitumen.

In a one liter reactor, 100 parts of asphalt (Petro-Canada Bow river, Penetration 290—see Table A above for properties) were heated to 150° C. Two parts of low density polyethylene (Esso Chemicals LL-6101, Mn=12,500 g mol$^{-1}$, Mw=40,000 g mol$^{-1}$, Melt Index 20) then were added and dispersed in the asphalt as molten liquid droplets with a high shear mixer (Brinkman Polytron Mixer) for 30 minutes at 150° C. After mixing was stopped, the dispersion of polyethylene droplets rapidly coalesced and a viscous polyethylene layer formed on the surface of the liquid asphalt, which could not be readily redispersed. This lack of stability against gross phase separation, even after high shear mixing, is typical of polyolefin dispersions in asphalt. The rapid coalescence of the molten polyethylene particles is seen from the photograph of FIG. 1.

Example 2

This Example illustrates the effect of added polyethylene wax to bitumen-polyethylene emulsions.

In a one liter reactor, 100 parts of asphalt (Petro-Canada Bow River, Penetration 290) were heated to 150° C. Two parts of low density polyethylene (Esso Chemicals LL-6101) and 0.5 parts of a caboxylated polyethylene wax (Eastman Chemicals Epolene C-16 molecular weight=8000 g mol$^{-1}$, density at 25° C.=0.908 g mol$^{-1}$, acid number=5) then were added and dispersed as molten liquid droplets with a high shear mixer as in Example 1. A fine dispersion of polyethylene droplets was obtained in 15 minutes due to the presence of the C-16 wax but, after mixing was stopped, the dispersion quickly separated into readily observable phases, a viscous polyethylene surface layer being visible after the sample stood for a few hours. Although the carboxylated polyethylene wax appears to hasten dispersal of the polyethylene within the asphalt, this material apparently does not stabilize the dispersion against gross phase separation once mixing is stopped.

Example 3

This Example illustrates the present invention.

Carboxylated polyethylene (0.5 parts Du Pont Fusabond D-101, density at 25° C.=0.920 g mol$^{-1}$, Melt Flow Index= 11 to 18; anhydride content=0.07 g mole-kg of resin, base polymer is linear low density polyethylene) was dispersed in 25 parts asphalt (Petro-Canada Bow river, Penetration 290) at 150° C. for 30 min. Then 1.4 parts liquid polybutadiene (Ricon 134, Colorado Chemical Specialties Inc, Microstructure 80±5% trans- and cis- 1,4, 20±5% 1,2-vinyl, molecular weight (Mw)=12,000, Acid Number (KOH/g)=nil), 0.6 parts of a liquid amine-terminated poly(butadiene-co-acrylonitrile) (ATBN) (10 per cent acrylonitrile, in liquid form, catalog No. 549, Scientific Polymer Products Inc., amine equivalent weight=1200 g/mole), and 0.2 parts elemental sulfur were added in order and mixed under high shear for 2 hours at a temperature between 150° and 170° C. To this stirred mixture was added 75 parts additional asphalt (Bow River 290) and 3 parts low density polyethylene (Esso Chemicals 6101, Melt Flow Index 20). After 5 to 20 minutes dispersal of the polyethylene as liquid droplets was complete and, after stirring was terminated, no visual changes in particle size and distribution of polyethylene dispersion were apparent after 3 days storage at 160° C. The retained dispersed nature of the polyethylene droplets can be seen from the photograph of FIG. 2.

Example 4

The method of Example 3 was repeated with 3 parts of high density polyethylene (Du Pont Sclair 2914, Melt Flow Index=45, density at 25° C.=0.96 g mol$^{-1}$) instead of 3 parts of the low density polyethylene. The resulting asphalt emulsion was stable for 3 days at 160° C. without observable changed in particle size or viscosity.

Example 5

The method of Example 3 was repeated using 0.5 parts carboxylated polyethylene wax (Eastman Chemical Products Epolene C-16 Wax, molecular weight less than 10,000), instead of Du Pont Fusabond D-101 carboxylated polymer. This substitution also produced a stable emulsion at 160° C. This experiment demonstrates that the carboxylated polyethylene component may have a relatively low molecular weight (a wax having a molecular weight less than 10,000 g/mole) as in this Example or a high molecular weight polymer (Melt Flow Index 11–18) as in Example 3.

Example 6

The method of Example 3 was repeated with Lloydminster 85–100 Penetration grade asphalt (Petro-Canada Clarkson Refinery—See Table A above for properties) instead of Bow River 290 asphalt. The resulting emulsion was stable at 160° C.

Examples 7 to 9

The method of Example 3 was repeated with variable ratios of reactants as shown in Table 1 below (parts by weight). The compositions of Examples 7 to 9 were all found to be stable at 160° C. for at least 3 days. These Examples demonstrate that the viscosities and particle sizes of the emulsified particles may be adjusted by appropriate control of the reagent concentrations.

Example 10

The method of Example 3 was repeated without the addition of 0.6 parts amine terminated (poly(butadiene-co-acrylonitrile)). The resulting emulsion underwent gross phase separation as evidence by microscopic observation.

Example 11

The method of Example 3 was repeated without the addition of sulfur. The resulting emulsion was unstable against gross phase separation as evidenced by microscopic observation.

Example 12

The method of Example 3 was repeated without the addition of the liquid polybutadiene. The resulting emulsion was unstable against gross phase separation, as evidenced by microscopic observation.

Example 13

The method of Example 3 was repeated and the sample was permitted to cool to ambient temperature, then reheated up to 160° C. again several times. The stability of the polyethylene dispersion in the asphalt and the viscosity of the sample were not obviously changed. The reheated dispersed nature of the polyethylene droplets can be seen from the photograph of FIG. 3.

Figure 2:
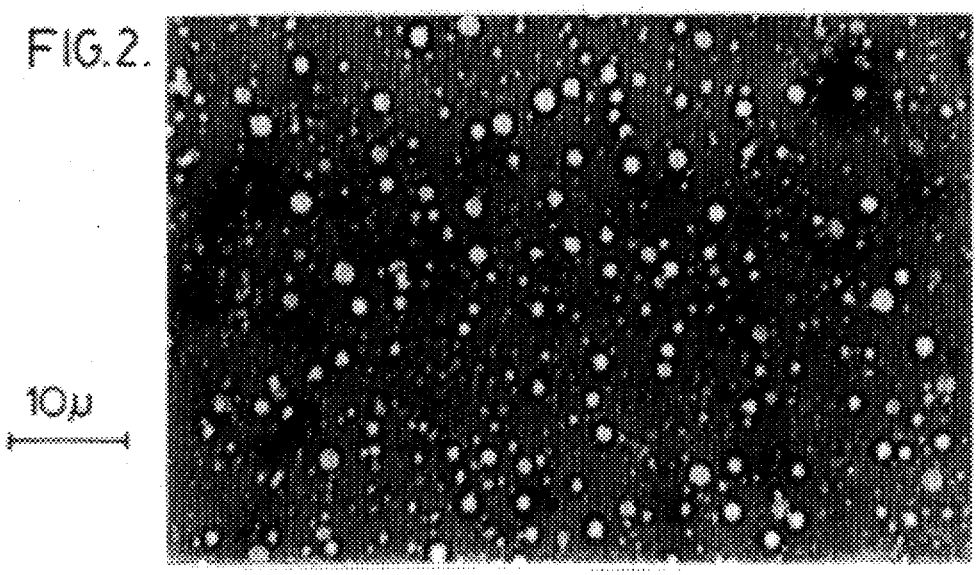
FIG. 2 is a high magnification (×1650) photograph of a sample polyethylene-bitumen composition stabilized against gross phase separation as obtained using the method of Example 3 according to the invention, after 3 days at 160° C. without stirring.

The result of the foregoing Examples 1 to 13 have been tabulated for convenience of reference in the following Table I:

It should also be understood that the photographs of FIGS. 1 and 2 are of molten bitumen-polymer compositions at an elevated temperature. The coalesced state shown in FIG. 1 illustrates a system which undergoes gross phase separation. Such a system thus displays different behavior, over time, than the type of system shown in FIG. 2. The FIG. 1 system when dispersed, initially gives an appearance similar to that shown in FIG. 2, but with time the particles, whose movement is visible under a hot-stage microscope at 160° C., coalesce into the large polymer particles shown in FIG. 1 as polymer droplets encounter each other. On the other hand, the system of FIG. 1, although the some movement of particles is evident, does not indicate any coalescence of smaller particles into larger ones such as those of FIG. 1. On a larger scale, the system of FIG. 1 undergoes readily observable gross phase separation while the system of FIG. 2 is stabilized against such gross phase separation. It will further be appreciated that the diameters of stabilized particles evident in FIG. 2 are on the order of from about 0.1 to about 1 or 3 microns.

SUMMARY OF DISCLOSURE

In summary of this disclosure, the present invention provides novel stabilized non-aqueous liquids having a dispersed particulate phase, in particular a stabilized polymer-modified bitumen composition which resists polymer phase separation in liquid bitumen medium, both at ambient and elevated temperatures, by the use of a unique steric stabilization system. Modifications are possible within the scope of this invention.

What we claim is:

1. A stable bituminous composition, comprising:

a continuous bituminous phase, a dispersed particulate phase of olefinic polymer insoluble in said bituminous phase, a steric stabilizer in the form of an envelope surrounding and anchored to each particle in said particulate phase and comprising a cross-linked structure compatible with said bituminous phase to maintain dispersed par-

TABLE I

Examples of Polyethylene Emulsions in Asphalt Medium

| Component, phr | Examples | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13** |
| Asphalt (Bow river 290) | 100 | 100 | 100 | 100 | 100 | — | 100 | 100 | 100 | 100 | 100 | 100 | 100 |
| Asphalt (Lloyd 85/100) | — | — | — | — | — | 100 | — | — | — | — | — | — | — |
| LLDPE (LL6101) | 2 | 2 | 3 | — | 3 | 3 | 2 | 1 | 1 | 3 | 3 | 3 | 3 |
| HDPE (DuPont2914) | — | — | — | 3 | — | — | — | — | — | — | — | — | — |
| PE-9-ma | — | 0.5 | 0.5 | 0.5 | — | 0.5 | — | 0.5 | 0.5 | 0.5 | 0.5 | 0.5 | 0.5 |
| C-16 Wax+ | — | — | — | — | 1 | — | 0.5 | — | — | — | — | — | — |
| LPBD° | — | — | 1.4 | 1.4 | 1.4 | 1.4 | 0.75 | 4.2 | 0.7 | 1.4 | 1.4 | — | 1.4 |
| ATEN°° | — | — | 0.6 | 0.6 | 0.6 | 0.6 | 0.25 | 1.8 | 0.3 | — | 0.6 | 0.6 | 0.6 |
| Sulfur | — | — | 0.2 | 0.2 | 0.2 | 0.2 | 0.15 | 0.7 | 0.15 | 0.2 | — | 0.2 | 0.2 |
| Viscosity* (cP) (160° C., 50 rpm) | 114 | — | 509 | 520 | 344 | — | 175 | 607 | 216 | — | — | — | — |
| Stability | no | no | yes | yes | yes | yes | yes | yes | yes | no | no | no | yes |

+a carboxylated polyethylene wax
°ATEN: amino terminated poly(butadiene-co-acrylonitrile), liquid, acrylonitrile 10%
°°LPBD: Liquid polybutadiene, Mw: around 12,000
*no obvious viscosity difference in viscosity of the stable samples (Examples 3 to 9) before storage and after 3 days hot storage
**The sample in Example 3 was cooled to ambient temperature (20° to 25° C.) and reheated to 160° C. again, three times.

ticles of said olefinic polymer spaced from each other in said bituminous phase, so as to inhibit separation of said particulate phase from said bituminous phase by progressive coalescence of dispersed particles.

2. The composition of claim 1 wherein said bitumen comprises an asphalt and said olefinic polymer comprises a homopolymer or copolymer of ethylene.

3. The composition of claim 2 wherein said steric stabilizer comprises polydiene compatible with said asphalt and anchored to each said particle of polymeric material.

4. A composition for forming a stable dispersion of particulate olefinic polymer in a continuous bituminous phase, comprising
a pro-steric stabilizer dissolved in a bituminous-compatible component,
said pro-steric stabilizer comprising a bitumen-compatible stabilizer segment bonded to an olefinic polymer-compatible stabilizer segment different from the bitumen-compatible stabilizer segment.

5. A method of forming a stable bituminous composition, which comprises:
dispersing an olefinic polymer in a continuous bituminous phase in which said olefinic polymer is insoluble at an elevated temperature above the fusion temperature of the olefinic polymer to form a dispersion containing small particles of said olefinic polymer in the presence of steric stabilizer-forming components comprising a first individual component for anchoring to said olefinic polymer particles and a second individual component different from said first individual component soluble in said bituminous phase, and
effecting chemical bonding between said steric stabilizer forming components and bonding to said olefinic polymer particles to form a steric stabilizer in the form of an envelope surrounding and anchored to each olefinic polymer particle and comprising a cross-linked structure compatible with the bituminous phase to maintain said olefinic polymer particles spaced apart from each other in said bituminous phase.

6. The method of claim 5 wherein said olefinic polymer dispersed in said bitumen is a homopolymer or copolymer of ethylene having a melting point which permits dispersion of said olefinic polymer as molten droplets in bitumen at a temperature of about 120° to about 190° C.

7. The method of claim 6 wherein said steric stabilization forming components comprise a polydiene, as said second individual component, bound of an olefinic polymer compatible with said homopolymer or copolymer of ethylene, as said first individual component.

8. A method of forming a bituminous composition, which comprises:
dissolving a functionalized diene in bitumen,
dispersing a functionalized olefinic polymer in said bitumen,
reacting said functionalized olefinic polymer and said functionalized diene so as to bind one end of said olefinic polymer to said diene by interaction of the functional groups, and
dispersing an olefinic polymer in said bitumen to form a stable bituminous composition in which the functionalized olefinic polymer is anchored to the olefinic polymer particles dispersed in the bitumen to maintain the dispersed olefinic polymer particles spaced from each other in the bitumen, so as to inhibit separation of the olefinic polymer particles from the bitumen by progressive coalescence of dispersed olefinic polymer particles.

9. The method of claim 8 wherein said functionalized diene is an amine-terminated polybutadiene and said functionalized olefinic polymer is a carboxylated olefinic polymer.

10. The method of claim 9 wherein unfunctionalized polybutadiene also is dissolved in said bitumen and said unfunctionalized polybutadiene is subjected to partial cross-linking with said functionalized polybutadiene and itself.

11. The method of claim 10 wherein said partial cross-linking is initiated by a free-radical initiator.

12. The method of claim 11 wherein said free-radical initiator is sulfur, with or without sulfur accelerators.

13. The method of claim 12 wherein carboxylated polyethylene, liquid unfunctionalized polybutadiene, amine-terminated polybutadiene and elemental sulfur are dispersed in bitumen at a temperature of about 100° to about 250° C. by stirring until a homogenous composition is formed.

14. The method of claim 13 wherein said homogenous composition is formed in about 0.5 to about 2.5 hours.

15. The method of claim 8, wherein said olefinic polymer dispersed in said bitumen is a polyethylene having a melting point of about 115° to about 130° C. and said dispersing step is effected at a temperature of about 120° to about 190° C. and above the melting point of the polyethylene to form liquid droplets of said polyethylene in said bitumen.

16. The method of claim 15 wherein additional bitumen is added to said bituminous composition.

17. The composition of claim 1 wherein said steric stabilizer comprises a first individual component comprising an olefinic polymer anchored to said particulate phase and a second individual component comprising a polydiene soluble in said bituminous phase and bonded to said first component.

18. The composition of claim 17 wherein said first and second components are bonded by interaction of functional groups provided on said components.

19. The composition of claim 18 wherein the functionalized olefinic polymer is a carboxylated polyethylene and the functionalized polydiene is an amino-terminated diene.

20. The composition of claim 1 wherein said dispersed particulate phase comprises about 0.1 to about 10 wt. % of the continuous bituminous phase.

21. The composition of claim 17 wherein the first individual component comprises about 0.1 to about 5 wt. % of the continuous bituminous phase and the second individual component comprises about 0.1 to 3 wt. % of the continuous bituminous phase.

22. The composition of claim 21 wherein said first individual component is present in an amount of about 0.3 to about 1 wt. % and said second individual component is present in an amount of about 0.2 to about 1 wt. %.

23. The composition of claim 21 wherein said dispersed particulate phase comprises about 0.1 to about 10 wt. % of the continuous bituminous phase.

24. The composition of claim 23 wherein said dispersed particulate phase is present in an amount of about 1 to about 5 wt. %.

25. The composition of claim 19 wherein liquid polybutadiene also is present in the composition.

26. The composition of claim 25 wherein said liquid polybutadiene is present in an amount of about 0.1 to about 10 wt. % of the continuous bituminous phase.

27. The composition of claim 26 wherein said amount is from about 0.4 to about 6 wt. %.

28. The composition of claim 4 wherein said bitumen-compatible stabilizer segment is a functionalized polydiene and said olefinic polymer-compatible segment is a functionalized polyolefin and said segments are bonded by interaction of the functional groups.

29. The composition of claim 20 wherein said functionalized olefinic polymer is a carboxylated polyethylene and said functionalized polydiene is an amino-terminated diene.

30. The method of claim 6 wherein said homopolymer and/or copolymer of ethylene comprises polyethylene having a fusion temperature of about 115° to about 130° C.

31. The method of claim 7 wherein said polydiene comprises a homopolymer or copolymer of butadiene, said olefinic polymer comprises a homopolymer or copolymer of ethylene and said bonding of said components is effected by interaction between amine termination on said butadiene polymer and carboxyl termination on said ethylene polymer.

32. The method of claim 5 wherein additional bitumen is added to the bituminous composition.

33. The method of claim 13, wherein said unfunctionalized polybutadiene has a molecular weight of about 500 to about 45,000 and is soluble in bitumen.

* * * * *